United States Patent
Lee

(10) Patent No.: US 8,843,140 B2
(45) Date of Patent: Sep. 23, 2014

(54) METHOD AND APPARATUS FOR SUPPORTING A HANDOVER IN A BROADBAND WIRELESS ACCESS COMMUNICATION SYSTEM

(75) Inventor: Dae-Woo Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 279 days.

(21) Appl. No.: 13/516,470

(22) PCT Filed: Dec. 14, 2010

(86) PCT No.: PCT/KR2010/008938
§ 371 (c)(1),
(2), (4) Date: Oct. 17, 2012

(87) PCT Pub. No.: WO2011/074856
PCT Pub. Date: Jun. 23, 2011

(65) Prior Publication Data
US 2013/0029670 A1    Jan. 31, 2013

(30) Foreign Application Priority Data
Dec. 15, 2009 (KR) .......... 10-2009-0124962

(51) Int. Cl.
H04W 36/00 (2009.01)
H04W 36/08 (2009.01)

(52) U.S. Cl.
CPC .................. *H04W 36/08* (2013.01)
USPC .......... 455/444; 455/436; 455/422.1

(58) Field of Classification Search
USPC ............ 455/436–444, 452.1–454
See application file for complete search history.

(56) References Cited

U.S. PATENT DOCUMENTS

| 2009/0005099 A1* | 1/2009 | Jung et al. ........ 455/517 |
| 2009/0186615 A1* | 7/2009 | Kwon et al. ........ 455/436 |
| 2009/0257390 A1* | 10/2009 | Ji et al. ........ 370/329 |
| 2009/0291690 A1* | 11/2009 | Guvenc et al. ........ 455/444 |
| 2010/0144338 A1* | 6/2010 | Kim et al. ........ 455/422.1 |

FOREIGN PATENT DOCUMENTS

KR   10-2009-0112337 A   10/2009

* cited by examiner

*Primary Examiner* — Kashif Siddiqui
(74) *Attorney, Agent, or Firm* — Jefferson IP Law, LLP

(57) ABSTRACT

A method and an apparatus for supporting a handover in a broadband wireless access communication system are provided. The method includes configuring mapping information based on information related to base station IDs (BS-IDs) and power used in a plurality of sub base station, and transmitting the mapping information to the plurality of femto base stations, and when a handover request is received from a terminal, performing a handover to one of the plurality of femto base stations is set as a target base station.

24 Claims, 5 Drawing Sheets

Fig. 3

```
BS-ID            : 0x12:34:56:78:9a:bc
Carrier (FA)     : 2400~2430
Channel BW       : 10 MHZ
MAX TX power     : 50mS~200mW
                      .
                      .
                      .
```

METHOD AND APPARATUS FOR SUPPORTING A HANDOVER IN A BROADBAND WIRELESS ACCESS COMMUNICATION SYSTEM

CROSS-REFERENCE TO RELATED APPLICATIONS

This application is a National Stage application under 35 U.S.C. §371 of an International application filed on Dec. 14, 2010 and assigned application No. PCT/KR2010/008938, and claims the benefit under 35 U.S.C. §365(b) of a Korean patent application filed in the Korean Industrial Property Office on Dec. 15, 2009 and assigned Serial No. 10-2009-0124962, the entire disclosure of which is hereby incorporated by reference.

BACKGROUND OF THE INVENTION

1. Field of the Invention

The present invention relates to a broadband wireless communication system. More particularly, the present invention relates to a method and an apparatus for supporting a handover in a broadband wireless communication system.

2. Description of the Related Art

In the 4th Generation (4G) communication system, research for providing users with services having various Quality of Service (QoS) with a transmission rate of approximately 100 Mbps is in progress. In the current 4 G communication system, research for supporting high-speed services for a Broadband Wireless Access (BWA) communication system, such as a wireless local area communication network system and a wireless metropolitan area network system, in a form of securing mobility and QoS have been actively undertaken. A representative communication system is the Institute of Electrical and Electronics Engineers (IEEE) 802.16 system.

FIG. 1 is a view illustrating a macro cell in which a plurality of femto cells is installed in the IEEE 802.16 system according to the related art.

Referring to FIG. 1, the plurality of femto cells are included in a first macro cell C-10 formed by a first macro base station 10 and a second macro cell C-20 formed by a second macro base station 20.

When a terminal enters a coverage area of a neighboring base station from a serving base station from which the terminal is receiving the service, the terminal performs a handover in order to continuously receive the service. In this case, the terminal re-selects a new base station for entrance. According to a handover method in the IEEE 802.16e system, the terminal receives a neighbor base station list from the serving base station, searches for neighbor base stations by using the neighbor base station list, and then determines a handover target base station.

In order to support rapid handover, the first macro BS 10 registers the neighboring second macro BS 20 and other macro base stations in the neighbor list.

The first macro BS 10 inserts radio configuration information of respective adjacent base stations, as well as a list of the adjacent base stations, in the neighbor list. The first macro BS 10 inserts Base Station IDentifiers (BS-IDs) of the corresponding adjacent base stations in a MOBile_NEighBor-ADVertisement (MOB_NBR-ADV) broadcast message and transfers the neighbor list to terminals located within the cell.

Accordingly, the terminals may perform the rapid handover by periodically measuring signals of the neighbor base stations and using the measured signals. The terminal measures a Received Signal Strength Indicator (RSSI) and a Carrier to Interference and Noise Ratio (CINR) of each adjacent base station by using information, such as a center frequency, a bandwidth, an FFT size, a preamble index, a frame duration, and Base Station Equivalent Isotropically Radiated Power (BS_EIRP) of the adjacent base station obtained through the MOB_NBR-ADV received from the serving base station which the terminal currently accesses. The RSSI and the CINR of the adjacent base station are compared with an RSSI and a CINR of the serving base station, and one or more adjacent base stations are selected as handover target base stations by using the comparison result. Accordingly, a transmission power (TX power) of the base station included in the neighbor list is a necessary factor for the determination of a normal handover of the terminal. However, in the WiMAX standard, the number of neighbor lists available in one base station is limited to 255, and all base stations must use unique Base Station IDentifiers (BS-IDs). Accordingly, when a plurality of pico BSs or femto BSs are included in one macro BS area, it is impossible to provide a normal handover to the terminal due to the limitation of the number of neighbor lists. An alternative for overcoming the limitation of the number of BS-IDs includable in the neighbor list and performing a smooth handover is desired.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for overcoming limitation of the number of BS-IDs includable in a neighbor list in a broadband wireless communication system.

Another aspect of the present invention is to provide a method and an apparatus for improving a handover performance of a terminal through a control of femto/pico BS parameters (e.g. a TX power level) in a situation where a plurality of BSs use the same BS-ID in a broadband wireless communication system.

Another aspect of the present invention is to provide a method and an apparatus for efficiently obtaining air/Medium Access Control (MAC) configuration information on a femto/pico BS by a macro BS when the femto/pico BS performs an automatic initialization in a Self Organization Network (SON) scheme.

In accordance with an aspect of the present invention, a method of performing a handover in a macro base station of a broadband communication system is provided. The method includes configuring, by the macro base station, mapping information based on information related to Base Station IDentifiers (BS-IDs) and power used in a plurality of sub base stations, transmitting, by the macro base station, the mapping information to the plurality of sub base stations, and when a handover request is received from a terminal, performing the handover to one of the plurality of sub base stations as a target base station.

In accordance with another aspect of the present invention, a macro base station apparatus performing a handover in a macro base station of a broadband communication system is provided. The macro base station apparatus includes a controller for configuring mapping information based on information related to BS-IDs and power used in a plurality of sub base stations, for transmitting the mapping information to the plurality of sub base stations, and when a handover request is received from a terminal, for performing the handover to one of the plurality of sub base stations as the target base station.

In accordance with another aspect of the present invention, a method of performing a handover in a sub base station of a broadband communication system is provided. The method includes receiving, at the sub base station, mapping information configured using based on BS-IDs and information on power of a macro base station managing the sub base station from the macro base station by the sub base station, and when a handover request is received from a terminal, performing a handover to the sub base station from the macro base station by using the mapping information.

In accordance with another aspect of the present invention, an apparatus for performing a handover in a sub base station of a broadband communication system is provided. The apparatus includes a controller for receiving mapping information configured using based on BS-IDs and information on power of a macro base station managing the sub base station from the macro base station, and when a handover request is received from a terminal, for controlling a handover to the sub base station from the macro base station by using based on the mapping information when a handover request is received from a terminal.

According to exemplary embodiments of the present invention, in a situation where a plurality of BSs use the same BS-ID in a broadband wireless communication system, a terminal may perform a smooth handover in a region in which the plurality of base stations are densely located through the control of femto/pico BS parameters (e.g. a TX power level).

Exemplary embodiments of the present invention may support efficient handover when a plurality of femto/pico BSs are included in a service area of a macro BS.

According to exemplary embodiments of the present invention, the macro BS may efficiently obtain the air/MAC configuration information on the femto/pico BS when the femto/pico BS performs an automatic initialization in the SON scheme.

Exemplary embodiments of the present invention enable smooth handover even in a region in which the BSs are densely located without the change of a wireless interface between a femto base station and an existing terminal, as well as a standard interface of a macro network.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 3 illustrates an example of information on basic configuration parameters for an SON obtained from an SON server or a management server when a BS is initialized according to an exemplary embodiment of the present invention;

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, a detailed explanation of known related functions and constitutions may be omitted so as to avoid unnecessarily obscuring the subject manner of the present invention. Hereinafter, exemplary embodiments of the present invention will be described with reference to accompanying drawings in detail. Exemplary embodiments of the present invention enable a terminal to perform a smooth handover in a region in which a plurality of Base Stations (BSs) are densely located through a control of femto/pico BS parameters (e.g. a TX power level) in a situation where the plurality of BSs share a Base Station Identifier (BS-ID) in a broadband wireless communication system. According to exemplary embodiments of the present invention, in order to control the femto/pico BS parameters, the frequency bands, TX power, Downlink channel Descriptor (DCD) CCCs, and Uplink Channel Descriptor (UCD) CCCs usable by the femto/pico BSs to the BS-IDs of the femto/pico BSs are mapped and managed. Hereinafter, exemplary embodiments of the present invention will be described based on a wireless communication system in an Orthogonal Frequency Division Multiplexing (OFDM)/Orthogonal Frequency Division Multiple Access (OFDMA) scheme. However, exemplary embodiments the present invention may be applied to a wireless communication system in a different scheme. Further, the femto/pico BS used herein includes at least one of a femto BS and a pico BS.

Figure 1:
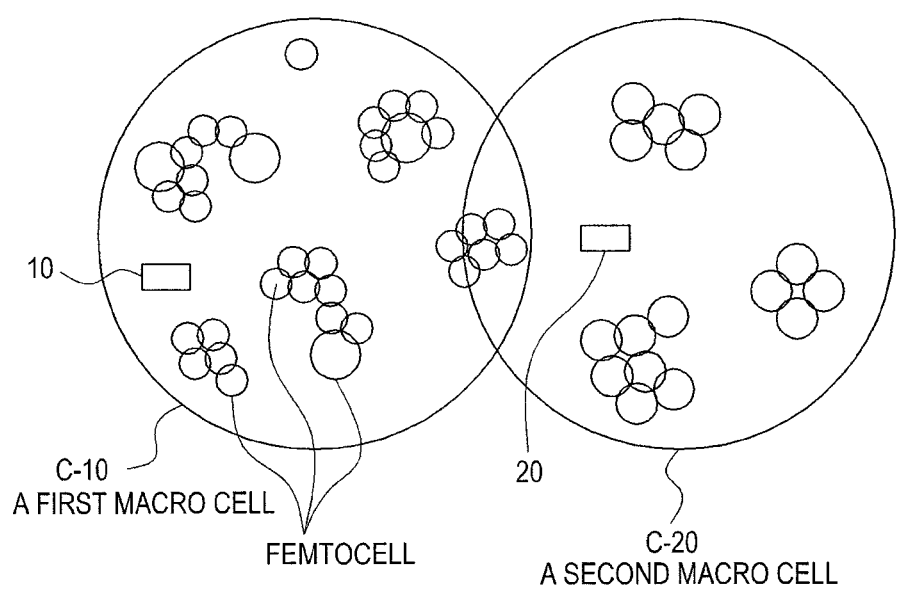
FIG. 1 is a view illustrating a macro cell in which a plurality of femto cells are installed in the IEEE 802.16 system according to the related art.
Figure 2:
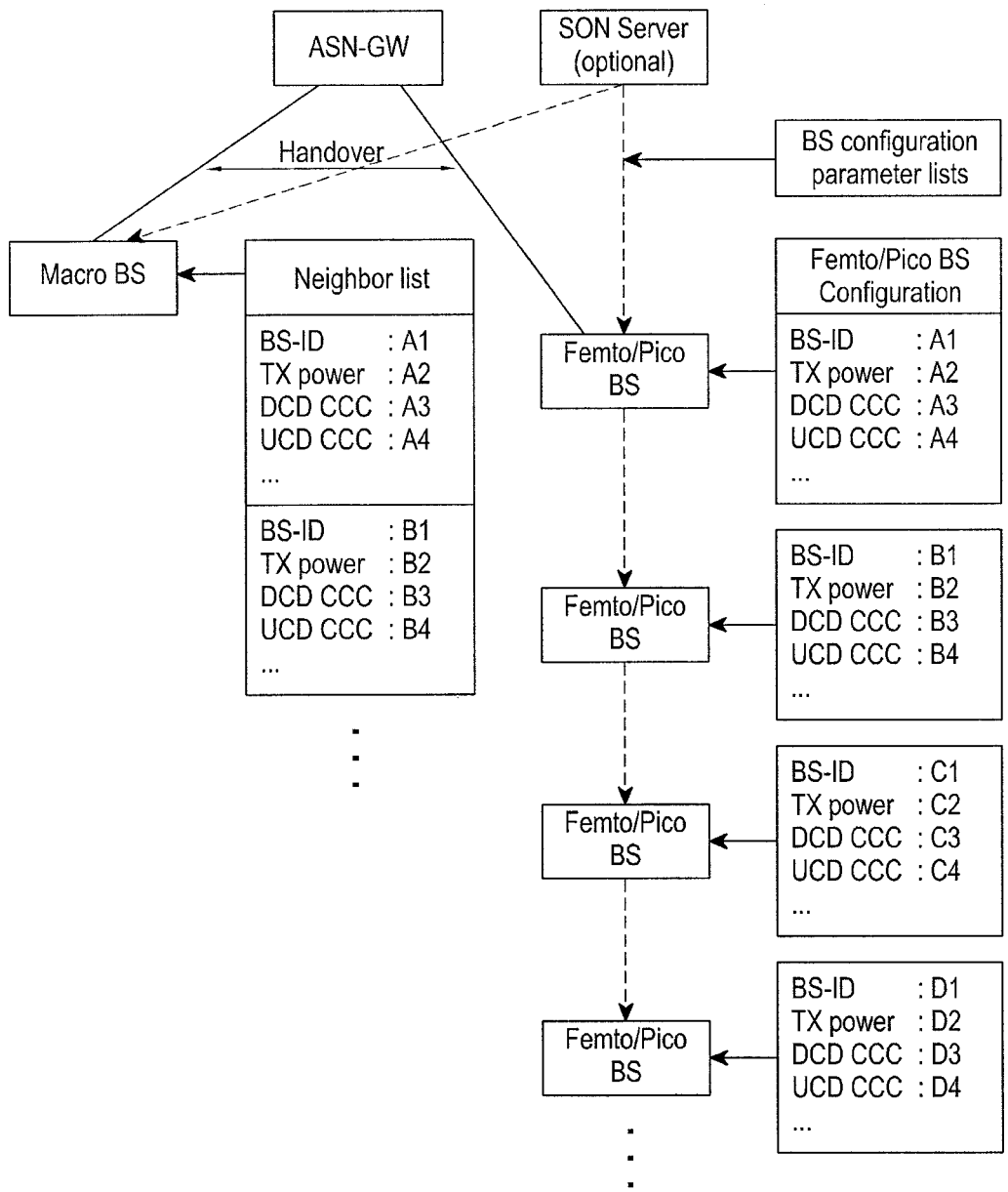
FIG. 2 illustrates an example of a neighbor list of a macro BS in a general broadband wireless communication system according to an exemplary embodiment of the present invention.

FIG. 2 illustrates an example of a neighbor list of a macro BS in a general broadband wireless communication system according to an exemplary embodiment of the present invention.

Referring to FIG. 2, the BS-ID used by the femto/pico BS should be unique. The macro BS should know air/MAC configuration parameters of the femto BSs in order to support the handover for the femto BSs. However, the femto BS generally initializes a system based on a Self Organization Network (SON). The femto BS uses a network separated from a macro network, an Operation, Administration, and Maintenance (OAM) system separated from the macro network, and a SON server separated from the macro network. Accordingly, when the macro BS configures a neighbor list for the femto BSs, it is difficult to obtain information on the necessary air/MAC configuration parameters.

FIG. 3 illustrates an example of information on basic configuration parameters for an SON obtained from the SON server or a management server when a BS is initialized according to an exemplary embodiment of the present invention.

Referring to FIG. 3, the obtained information may include the BS-ID (optional), a frequency band (or a center frequency), a channel Band Width (channel BW), a transmission allowable power range, etc. The BS determines the BS-ID, an optimum frequency, and a TX power according to an SON algorithm based on the obtained information. In this case, the BS-ID may be designated by the SON/management server or may be an internally stored value.

Figure 4:
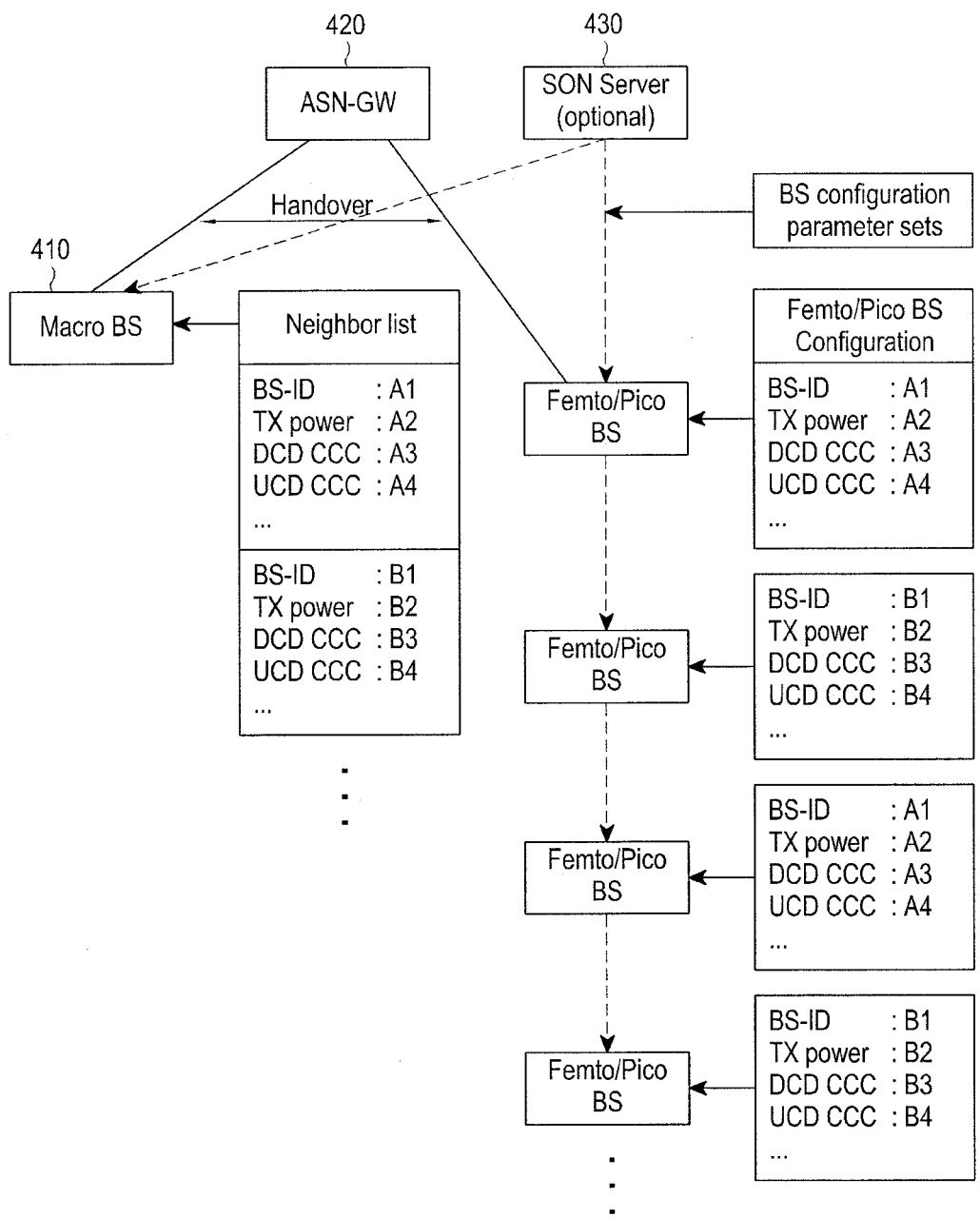
FIG. 4 illustrates an example of a neighbor list of a macro BS in a broadband wireless communication system according to an exemplary embodiment of the present invention.

FIG. 4 illustrates an example of a neighbor list of a macro BS in a broadband wireless communication system according to an exemplary embodiment of the present invention.

Referring to FIG. 4, a BS 410 is a system located between an Access Service Network Gateway (ASN/GW) 420 and a terminal. The BS 410 provides a subscriber with a connection of a radio section by performing a wireless interfacing according to IEEE 802.16 standard and performs a function of a traffic encryption of the radio section. The BS may be a macro BS, a pico BS, a femto BS, etc.

The ASN/GW 420 is connected to an internet protocol network (not shown) and the BS, manages a connection and a mobility of the subscriber, and allocates a unique service flow for each UL/DL connection. The ASN-GW 420 may be a macro ASN-GW, a femto ASN-GW, etc.

The SON server 430 supports functions of an air parameter auto-configuration and an auto-optimization of the femto/pico BS. Generally, the SON function is mainly used by the pico BS and the femto BS, but may be used in a general macro BS. SON technology refers to technology of increasing a capacity of the BS and expanding a coverage area of the BS by automatically setting a configuration of a new BS when the new BS is installed and automatically optimizing operation information through an exchange of data related to a wireless environment between the BS and a terminal during the operation.

Exemplary embodiments of the present invention suggest three methods of performing the smooth handover in a region in which the plurality of BSs are densely located by the terminal through the control of the femto/pico BS parameters (e.g. a TX power level) in a situation where the plurality of BSs share the BS-ID in the broadband wireless communication system.

First method: minimizing a macro BS neighbor list through re-use of the BS-ID

Referring to FIG. 2, all BSs have different BS-IDs. However, exemplary embodiments of the present invention suggest a method of sharing the BS-ID in an air section by the plurality of BSs as illustrated in FIG. 4. Through the sharing of the BS-ID in the air section by the plurality of BSs, it is possible to overcome the limitation of the number of neighbor lists of the macro BS. In order for the plurality of BSs to share the BS-ID in the air section, coverage areas of transmission signals transmitted from the BSs sharing the BS-ID are necessarily prevented from overlapping. To this end, a plurality of shared BS-IDs is defined, and each BS selects a BS-ID such that the coverage areas do not overlap by using the SON function.

There are many cases in which the TX power of the femto/pico BS is relatively low and the femto/pico BS is installed indoors. When the femto/pico BS is installed indoors, the frequency distance range of the femto BS and the pico BS is very short. Accordingly, the plurality of femto/pico BSs may re-use the BS-IDs used in the air section.

Second Method: improving a handover performance through a control of configuration parameters (e.g. a TX power level) of the femto/pico BSs It may be impossible to secure a regular service when the terminal performs the handover to an area of the femto/pico BS from an area of the macro BS only with the simple sharing of the BS-ID of the femto/pico BSs, because the terminal cannot select a normal TX power after performing the handover to the area of the femto/pico BS from the area of the macro BS when each BS arbitrarily selects TX power, a DCD CCC, and an UCD CCC. Accordingly, exemplary embodiments of the present invention suggest a method of mapping frequency bands, TX power, DCD CCCs, and UCD CCCs available by the femto/pico BSs to the BS-IDs and managing them as a table. In this case, the TX power may use a range, not a specific value. Since a BS having the same BS-ID has the same TX power level, DCD CCC, and UCD CCC, exemplary embodiments of the present invention support a function of enabling the terminal to select a normal TX power after the terminal performs the handover.

Figure 5:
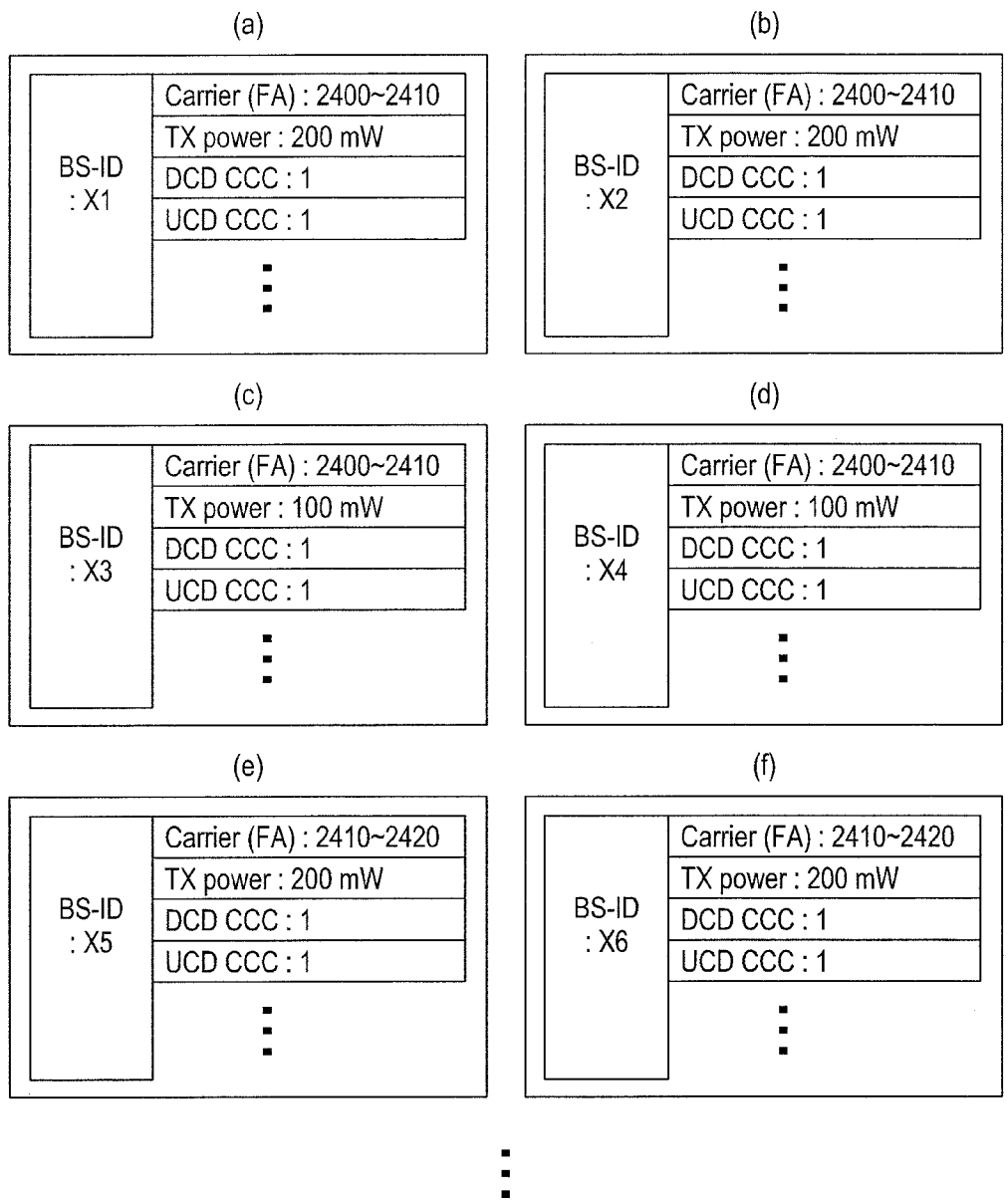
FIGS. 5A and 5F illustrate examples of BS-IDs and configuration parameters in femto/pico BSs managed by a macro BS according to an exemplary embodiment of the present invention.

FIGS. 5A and 5F illustrate examples of the BS-IDs and the configuration parameters in a femto/pico BSs managed by a macro BS according to an exemplary embodiment of the present invention.

The macro BS transmits a control signal for a network operation to a terminal and a plurality of femto BSs managed by the macro BS through a wireless channel. The plurality of femto BSs determine operation states by receiving the control signal from the macro BS and provide the control signal for the network operation to the macro BS and terminals managed by the plurality of femto BSs through the wireless channel. In this case, the macro BS configures mapping information by using at least one of BS-IDs, TX power, DCD CCCs, and UCD CCCs used by the plurality of femto BSs and shares the mapping information with the plurality of femto BSs. The macro BS receives a handover request from the terminal, and the macro BS performs the handover to one of the femto BSs as a target BS by using the mapping information. At least one of the BS-ID, the TX power, the DCD CCC, and the UCD CCC contains information on the basic configuration parameters for the SON obtained from the SON server or the management server when the BS is initialized.

A method of performing the handover to one of the femto BSs as a target BS by using the mapping information by the macro BS is described below.

In performing the handover to one of the femto BSs as a target BS by the macro BS, as illustrated in FIGS. 5A and 5B, when the BS-IDs are different, but the frequency bands, the TX powers, the DCD CCCs, and the UCD CCCs are the same, the macro BS including BS-ID: X1 may perform the handover to the femto/pico BS including BS-ID: X2.

Similarly, as illustrated in FIGS. 5C and 5D, when the BS-IDs are different, but the frequency bands, the TX powers, the DCD CCCs, and the UCD CCCs are the same, the macro BS including BS-ID: X3 may perform the handover to the femto/pico BS including BS-ID: X4.

As illustrated in FIGS. 5E and 5F, when the BS-IDs are different, but the frequency bands, the TX powers, the DCD CCCs, and the UCD CCCs are the same, the macro BS including BS-ID: X5 may perform the handover to the femto/pico BS including BS-ID: X6.

In order to minimize the use of the BS-IDs in an environment where two BSs are separated from each other, there is no interference, or there is no handover, the macro BS uses the same BS-ID. However, when two BSs are adjacently located, interference is generated, or a handover is generated between the two BSs, the macro BS may use two BS-IDs, may not use the same TX power, or may use different frequencies as illustrated in FIGS. 5A to 5F.

When the terminal does not accurately know the TX power of the BS, issues may arise in the operation of the handover.

The terminal should estimate a path loss in selecting its TX power. In this case, information on the TX power of the BS is needed for a calculation of the path loss. When the terminal does not know the correct TX power of the BS, the path loss is incorrectly calculated and thus a power value transmitted by the terminal is incorrectly determined. In this case, it is difficult to provide a regular service to the terminal. Accordingly, exemplary embodiments of the present invention employ a method of mapping the frequency bands, the TX powers, the DCD CCCs, and the UCD CCCs available by the femto/pico BSs to the BS-IDs and managing them.

Method of efficiently obtaining neighbor information on the macro BS

According to an exemplary embodiment of the present invention, the macro BS maps the frequency bands, the TX powers, the DCD CCCs, and the UCD CCCs to the BS-IDs used by the femto/pico BSs and manages them. When the macro BS simply manages the mapping information on the frequency bands, the TX powers, the DCD CCCs, and the UCD CCCs mapped to the BS-IDs used in the femto/pico BSs in a corresponding region, the macro BS may simply establish a neighbor list without incorporation with the femto/pico BSs or the femto management server. Further, even when a corresponding BS changes the air configuration parameters (e.g. a frequency band and a TX power) of the BS through the SON function, the macro BS may support the handover without separate communication with the femto/pico BSs.

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A method of performing a handover in a macro base station of a broadband communication system, the method comprising:
   configuring, by the macro base station, mapping information based on information related to Base Station IDentifiers (BS-IDs) and power used in a plurality of sub base stations;
   transmitting, by the macro base station, the mapping information to the plurality of sub base stations; and
   when a handover request is received from a terminal, performing the handover to one of the plurality of sub base stations as a target base station.

2. A macro base station apparatus for performing a handover in a macro base station of a broadband communication system, the macro base station apparatus comprising:
   a controller for configuring mapping information based on information related to BS-IDs and power used in a plurality of sub base stations, for transmitting the mapping information to the plurality of sub base stations, and for performing the handover to one of the plurality of sub base stations as the target base station when a handover request is received from a terminal.

3. The method of claim 1, wherein the mapping information further comprises at least one of a frequency band, a Downlink Channel Descriptor (DCD), and an Uplink Channel Descriptor (UCD).

4. The method of claim 3, wherein the sub base station is an indoor base station managing a femto cell.

5. The method of claim 4, wherein when the macro base station and a femto base station as the target base station have different BS-IDs but have the identical frequency band, information on the power, DCD, and UCD, the macro base station performs the handover to the femto base station.

6. The method of claim 4, wherein the macro base station selects the BS-ID such that coverage areas do not overlap based on a Self Organization Network (SON) function.

7. The method of claim 4, wherein the mapping information is configured by mapping at least one of the frequency band, the information on the power, the DCD, and the UCD usable by the femto base station to the BS-ID.

8. A method of performing a handover in a sub base station of a broadband communication system, the method comprising:
   receiving, at the sub base station, mapping information configured based on BS-IDs and information on power of a macro base station managing the sub base station from the macro base station; and
   when a handover request is received from a terminal, performing a handover to the sub base station from the macro base station by using the mapping information.

9. An apparatus for performing a handover in a sub base station of a broadband communication system, the apparatus comprising:
   a controller for receiving mapping information configured based on BS-IDs and information on power of a macro base station managing the sub base station from the macro base station, and for controlling a handover to the sub base station from the macro base station based on the mapping information when a handover request is received from a terminal.

10. The method of claim 8, wherein the mapping information further comprises at least one of a frequency band, a Downlink Channel Descriptor (DCD), and an Uplink Channel Descriptor (UCD).

11. The method of claim 10, wherein the sub base station is an indoor base station managing a femto cell.

12. The method of claim 11, wherein when the macro base station and a femto base station as a target base station have different BS-IDs but have the identical frequency band, information on the power, DCD, and UCD, the handover is performed to the femto base station.

13. The method of claim 11, wherein the BS-ID is selected based on a Self Organization Network (SON) function by the macro base station such that coverage areas do not overlap.

14. The method of claim 11, wherein the mapping information is configured by mapping at least one of the frequency band, the information on the power, the DCD, and the UCD usable by the femto base station to the BS-ID.

15. The macro base station apparatus of claim 2, wherein the mapping information further comprises at least one of a frequency band, a Downlink Channel Descriptor (DCD), and an Uplink Channel Descriptor (UCD).

16. The macro base station apparatus of claim 15, wherein the sub base station is an indoor base station managing a femto cell.

17. The macro base station apparatus of claim 16, wherein when the macro base station and a femto base station as the target base station have different BS-IDs but have the identical frequency band, information on the power, DCD, and UCD, the macro base station performs the handover to the femto base station.

18. The macro base station apparatus of claim 16, wherein the macro base station selects the BS-ID such that coverage areas do not overlap based on a Self Organization Network (SON) function.

19. The macro base station apparatus of claim 16, wherein the mapping information is configured by mapping at least one of the frequency band, the information on the power, the DCD, and the UCD usable by the femto base station to the BS-ID.

20. The apparatus of claim 9, wherein the mapping information further comprises at least one of a frequency band, a Downlink Channel Descriptor (DCD), and an Uplink Channel Descriptor (UCD).

21. The apparatus of claim 20, wherein the sub base station is an indoor base station managing a femto cell.

22. The apparatus of claim 21, wherein when the macro base station and a femto base station as a target base station have different BS-IDs but have the identical frequency band, information on the power, DCD, and UCD, the handover is performed to the femto base station.

23. The apparatus of claim 21, wherein the BS-ID is selected based on a Self Organization Network (SON) function by the macro base station such that coverage areas do not overlap.

24. The apparatus of claim 21, wherein the mapping information is configured by mapping at least one of the frequency band, the information on the power, the DCD, and the UCD usable by the femto base station to the BS-ID.

* * * * *